(12) United States Patent
Dorau et al.

(10) Patent No.: US 9,154,269 B2
(45) Date of Patent: Oct. 6, 2015

(54) METHOD FOR OPERATING A REMOTE PROCEDURE CALL HANDLER IN A CLIENT AND A SERVER AND COMPUTER SYSTEM COMPRISING THE SAME

(75) Inventors: Kai Dorau, Hannover (DE); Holger Kropp, Wedemark (DE)

(73) Assignee: Thomson Licensing, Issy-les-Moulineaux (FR)

( * ) Notice: Subject to any disclaimer, the term of this patent is extended or adjusted under 35 U.S.C. 154(b) by 626 days.

(21) Appl. No.: 13/135,187

(22) Filed: Jun. 28, 2011

(65) Prior Publication Data

US 2012/0011400 A1 Jan. 12, 2012

(30) Foreign Application Priority Data

Jul. 9, 2010 (EP) ..................................... 10305764

(51) Int. Cl.
*G06F 11/00* (2006.01)
*H04L 1/18* (2006.01)
*H04L 29/06* (2006.01)

(52) U.S. Cl.
CPC .............. *H04L 1/1887* (2013.01); *H04L 67/40* (2013.01)

(58) Field of Classification Search
USPC ................................. 714/15, 16, 18; 719/330
See application file for complete search history.

(56) References Cited

U.S. PATENT DOCUMENTS

| 5,475,819 | A | * | 12/1995 | Miller et al. ................... 709/203 |
| 5,608,870 | A | | 3/1997 | Valiant |
| 5,867,650 | A | | 2/1999 | Osterman |
| 5,956,509 | A | | 9/1999 | Kevner |
| 6,289,390 | B1 | | 9/2001 | Kavner |
| 6,321,274 | B1 | | 11/2001 | Shakib et al. |
| 6,546,425 | B1 | * | 4/2003 | Hanson et al. ................. 709/227 |
| 6,785,675 | B1 | | 8/2004 | Graves et al. |
| 6,901,596 | B1 | | 5/2005 | Galloway |
| 8,352,971 | B2 | * | 1/2013 | Marsala et al. ............... 719/330 |
| 2001/0011296 | A1 | | 8/2001 | Chandrasekaran et al. |

(Continued)

FOREIGN PATENT DOCUMENTS

| JP | 7006139 | 1/1995 |
| JP | 09330287 | 12/1997 |

(Continued)

OTHER PUBLICATIONS

EP Search Report dated Jan. 21, 2011.

(Continued)

*Primary Examiner* — Yolanda L Wilson
(74) *Attorney, Agent, or Firm* — Myers Wolin LLC (57) ABSTRACT

The invention is directed to a computer system comprising a server and a client and a method for operating a remote procedure call handler in the client and the server. The Method for operating a remote procedure call handler in the client according to the invention comprises the following steps:
a) sending a collected call message comprising a number of call messages to the server,
b) receiving an error message indicating a successful or erroneous transmission of the call messages comprised by the collected call message, wherein the error message indicates an erroneous transmission of at least one call message, wherein said at least one erroneous transmitted call message is retransmitted by the step of
c) sending a further collected call message comprising said erroneous transmitted call message as well as a plurality of further call messages.

22 Claims, 5 Drawing Sheets

(56) References Cited

U.S. PATENT DOCUMENTS

| | | |
|---|---|---|
| 2003/0061333 A1 | 3/2003 | Dean et al. |
| 2004/0098515 A1* | 5/2004 | Rezvani et al. ............... 709/400 |
| 2004/0111652 A1* | 6/2004 | Shoaib et al. .................... 714/15 |
| 2004/0205124 A1* | 10/2004 | Limprecht et al. ............ 709/204 |
| 2007/0038759 A1* | 2/2007 | Hanson et al. ................. 709/227 |
| 2009/0125781 A1 | 5/2009 | Jeong et al. |
| 2010/0077286 A1* | 3/2010 | Guagenti et al. .............. 715/205 |
| 2010/0125735 A1* | 5/2010 | Zapata et al. ................. 713/170 |

FOREIGN PATENT DOCUMENTS

| | | |
|---|---|---|
| JP | 10049393 | 2/1998 |
| JP | 2003150393 | 5/2003 |
| JP | 2007514990 | 6/2007 |
| WO | WO9630841 | 10/1996 |
| WO | WO03012578 | 2/2003 |
| WO | 2005041035 | 5/2005 |
| WO | WO2009158106 | 12/2009 |

OTHER PUBLICATIONS

Srinivasan et al., "RPC: Remote Procedure Call Protocol Specification", Version 2, Aug. 1995 (RFC 1831).

Johnson et al., "The Peregrine high-performance RPC system", Software—Practice and Experience, vol. 23, No. 2, Feb. 1993, pp. 201-221.

Conradi et al., "Error recovery mechanism for remote procedure call-based systems", 8th Annual International Conference on Computers and Communications, Scottsdale, Arizona, USA, Mar. 22, 1989, pp. 502-507.

\* cited by examiner

Fig. 5

METHOD FOR OPERATING A REMOTE PROCEDURE CALL HANDLER IN A CLIENT AND A SERVER AND COMPUTER SYSTEM COMPRISING THE SAME

This application claims the benefit, under 35 U.S.C. §119 of EP Patent Application 10305764.2, filed 9 Jul. 2010.

FIELD OF THE INVENTION

The invention pertains to a method for operating a remote procedure call handler in a client and in a server. The invention further pertains to a computer system comprising the client and the server, both communicating via a network preferably using a remote procedure call (RPC) protocol.

BACKGROUND OF THE INVENTION

It is understood that the terms client and server, frequently used in the following, describe a hardware entity, e.g. a computer, microprocessor, dedicated network chip, network card as well as a software entity, e.g. a process or program running on a suitable hardware. It is further understood that the terms client and server only apply to a particular transaction. Hardware or software entities can operate in both roles at different times. The terms client and server also refer to a classical transmitter and receiver scenario and in turn one or both of the aforementioned entities may be realized by help of hardware and/or software. It is further understood, a remote procedure call handler is a suitable software or hardware entity inside a server or a client that is handling at least the transmission and reception of call and reply messages, preferably by help of an RPC-protocol.

It is further understood, the term computer system, wherein such a computer system comprises a client and a server, is a suitable hardware entity having a client and a server that communicate via a network. The term computer system should not be restricted to a "classical" scenario where a plurality of standard computers is connected via network.

In such classical system, a client performs a remote procedure operation by sending a call message to the server via the network. The server responds by performing an operation and returns resulting data to the client in a reply message via the network. One way of invoking such an operation at the server is to pack all parameters necessary for the respective operation together into a call message and to transmit them to the server for processing. After performing the operation, the server returns the resulting data to the client in a reply message the same way.

A known specification for a remote procedure call (RPC) protocol is given by R. Srinivasan, "RPC: Remote Procedure Call Protocol Specification", Version 2, August 1995 (RFC 1831). This specification gives a definition of the call and reply process. Accordingly, a caller, i.e. the client, first sends a call message including all of the procedure's parameters to the server. Subsequently, the client waits (interrupts) for a reply message including the procedure's results from the server. Once the reply message is received, the results of the procedure are extracted and the client's execution is resumed. On the server side, the RPC process is dormant, awaiting the arrival of new call messages. In case such a call message arrives, the server starts extracting the procedure's parameters, computes the results and again sends a reply message; subsequently awaiting the next call message. According to this mode of operation, only one of the two processes, i.e. the server or the client process is active at any given time. This mode of operation is called a synchronous mode.

A further mode of operation is known from U.S. Pat. No. 6,321,374 B1, it should be referred to as an asynchronous mode. Accordingly, a plurality of call messages is packed together in order to form a collected call message, i.e. a plurality of call messages that is sent together from the client to the server using the RPC protocol. Such a collected call is advantageous for applications that do not require an immediate response. Several call messages are collected at the client until a call message needing an immediate response is generated. At that point, the collection of call messages is packed together and transmitted to the server. According to this technique, a substantial reduction in the number of requests is achieved. Further, the necessary overhead, generated by the network protocol for each data package sent via the network, is reduced due to the fact that several calls are packed together into a single data packet. Since the strict requirement is given up that only one of the two processes, i.e. the server or the client process, is active at any given time, the aforementioned mode of operation is called asynchronous.

However, the synchronous as well as the asynchronous mode apply standard solutions with respect to erroneous transmitted call and reply messages; e.g. known time-out or retransmission methods are used. Erroneous transmitted call and reply messages is understood in this context as messages received with errors at the receiving part, regardless if the error is caused by the sender, the transmission medium or the receiver.

SUMMARY OF THE INVENTION

It is an object of the present invention to provide a method for operating a remote procedure call handler in a client as well as in a server, the method being improved with respect to the handling of erroneous transmitted call and reply messages respectively. It is a further object of the invention to provide a computer system comprising such a client and server.

The object is reached by the subject matter of the independent claims, advantageous embodiments are subject matter of the dependent claims.

According to the invention, a method for operating a remote procedure call handler in a client being connected to a server via a network is provided. The following steps are executed:

a) Sending a collected call message comprising a number of call messages to the server.

b) Receiving an error message indicating a successful or erroneous transmission of the call messages comprised by said collected call message, wherein the error message indicates an erroneous transmission of at least one call message, and wherein said at least one erroneous transmitted call message is retransmitted by the step of:

c) sending a further collected call message to the server, said further collected call message comprising said erroneous transmitted call message as well as a plurality of further call messages.

According to the invention, a remote procedure handler in the server performs a complementary action in response to the client. This is, according to the invention, a method for operating a remote procedure call handler in a server being connected to a client via a network comprises the following steps:

a) receiving a collected call message (12) comprising a number of call messages (16) from the client (4), b) detecting at least one erroneous calls message (ERR) in the received collected call message (16), c) generating at least one error message (20) in response to the at least one erroneous call massage (ERR), d) retaining the at least one error message (20) until a collected reply message (14) comprising a number of reply messages (24) is ready for being sent to the client (4), and e) concatenating said at least one error message (20) to said reply messages (24) in said collected reply message (14), f) sending said collected reply message (14), comprising said at least one error message (20) as well as a plurality of further reply messages (24).

The method for operating a remote procedure call handler in a client and the method for operating a remote procedure call handler in a server are based on the following considerations:

In a network, connecting a server and a client, both communicating via a remote procedure call protocol, a considerable amount of network traffic is generated due to transmission of error messages and retransmissions of erroneous data packets, wherein call messages as well as reply messages are both regarded as data packets. According to the invention, the separate transmission of error messages and the separate retransmission of erroneous data packets are omitted.

With regard to the invention, a client is generally understood as a requesting entity in a network and a server is generally understood as an answering entity in the network.

In the following, the method according to the invention will be explained exemplarily by making reference to a scenario in which a client sends a collected call message to a server and said call message is transmitted erroneous.

The server receiving said erroneous call message, instead of sending a separate error message in response, retains the error message until the next reply message is sent to the client. The error message is concatenated to said reply message. As a consequence, the number of transmissions between server and client is reduced. In case more than one erroneous call message to be transmitted, more than one error message is concatenated to the reply message and consequently a further number of transmissions are omitted.

The client receiving the aforementioned reply message containing the error message proceeds in the same way. Instead of retransmitting a single call message to the server, the call message in question is retained by the client until the next collected call message has to be sent to the server. The erroneous transmitted call message is simply concatenated to the collected call message. Again, at least one transmission is omitted, in case of a plurality of erroneous call messages a plurality of transmissions is omitted.

The method according to the invention applies to the client server communication as well as vice versa to the communication between server and client. In other words, not only a scenario where a client sends an erroneous collected call message to a server but also a scenario where a server sends an erroneous reply message to the client may be assumed. In the latter case the method is completely analogous to the method describe above.

The method for operating a remote procedure call handler in a client according to claim 1 and the method for operating a remote procedure call handler in a server according to claim 4 are complementary and thus are linked together by a common concept.

Preferably, step b) of the method for operating a remote procedure call handler in a client further comprises receiving a collected reply message comprising at least one reply message dedicated to a call message comprised by said collected call as well as said collected error message. Further preferably the collected reply message comprises reply messages to all successfully transmitted call messages comprised by said collected call.

On the opposite side of the network, step f) of the method for operating a remote procedure call handler in a server further comprises, sending a collected reply message comprising at least one reply message dedicated to a call message of a collected call received together with the collected error message in step a). Further preferably the collected reply message comprises reply messages to all successfully received call messages comprised by said collected call.

Advantageously, the client as well as the server do not only retransmit call and reply messages, respectively, together with the next scheduled call and reply message. But the client receives a complete answer to the at least partly transmitted collected call in the next reply message. The amount of network traffic is further reduced due to this measure.

Advantageously, in case an urgent request is sent to the server, the concatenating of reply messages is interrupted and the urgent request is executed first. Preferably, the reply messages which were generated until then are sent by the server in a collected reply message, even if the collected reply message does not comprise as many reply messages as in the regular case.

BRIEF DESCRIPTION OF THE DRAWINGS

In the following the invention will be described in more details with reference to the figures.

DETAILED DESCRIPTION OF PREFERRED EMBODIMENTS

Figure 1:
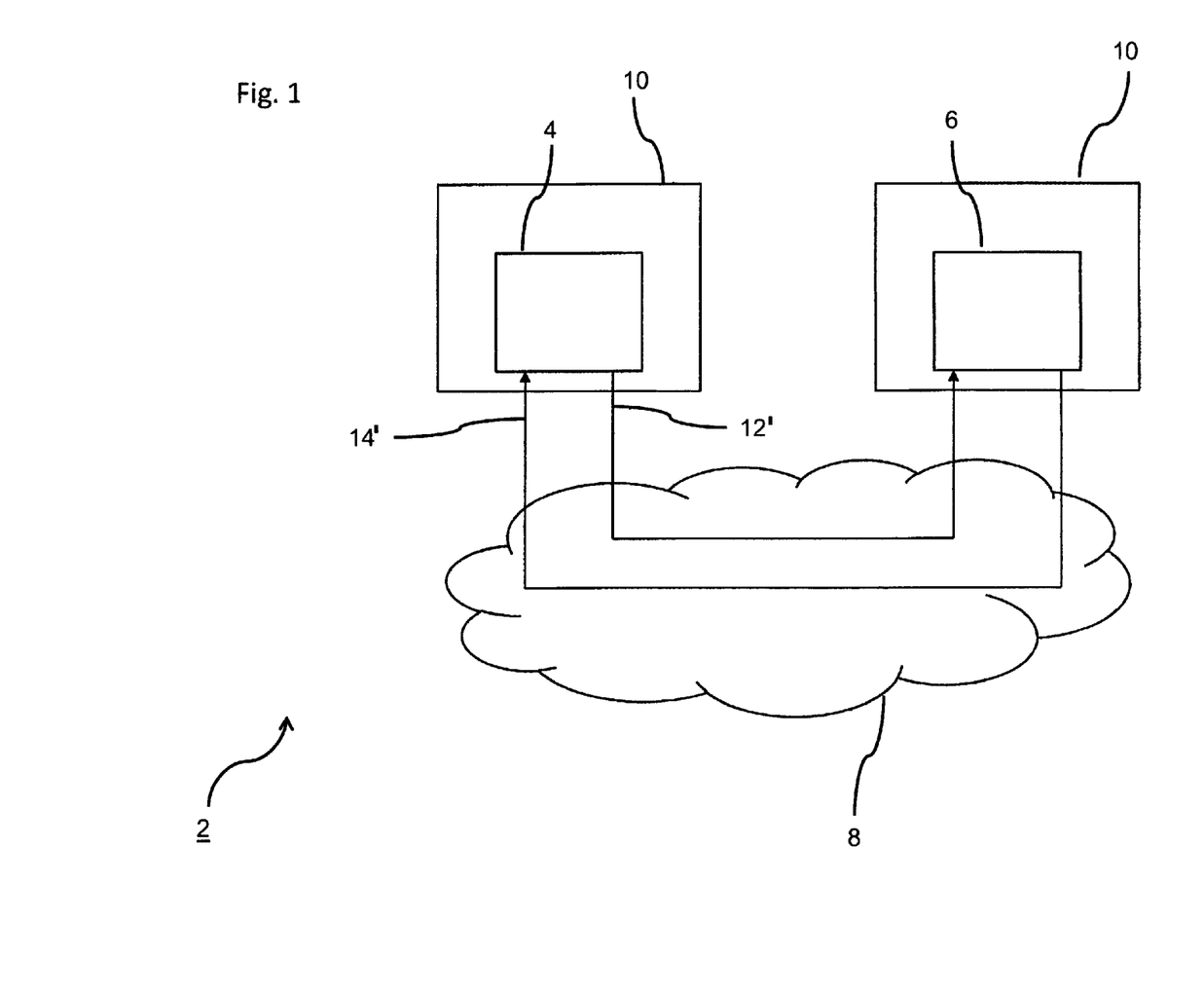
FIG. 1 shows a network comprising a client and a server.

FIG. 1 shows a computer system 2 comprising a client 4 and a server 6, both being interconnected via a network 8. The client 4 and the server 6 are comprised by a suitable hardware entity 10, e.g. a computer, microprocessor, network card, interface chip etc. According to the exemplary embodiment that is depicted in FIG. 1, the client 4 and the server 6 are applications running on the respective hardware 10, wherein client 4 and server 6 exchange data using a remote procedure call (RPC) protocol, preferably a protocol based on the RFC 1831. The client 4 sends a collected call message 12 via the network 8 to server 6, said collected call message 12 comprising a plurality of call messages that in turn comprise several parameters for a process that has to be carried out by the server 6. Resulting data, computed based on these parameters, is sent in a collected reply message 14 from the server 6 to the client 4. Similar to the collected call message 12, the collected reply message 14 comprises a plurality of reply messages. The collected reply message 14 as an answer to the collected call message 12 may comprise e.g. data to be displayed by the client 4. The data paths 12', 14' of the collected call messages 12 and the collected replay messages 14 are indicated in FIG. 1.

In the following, the client/server communication during sending of call messages will be explained by making references to FIGS. 2 and 3.

Figure 2:
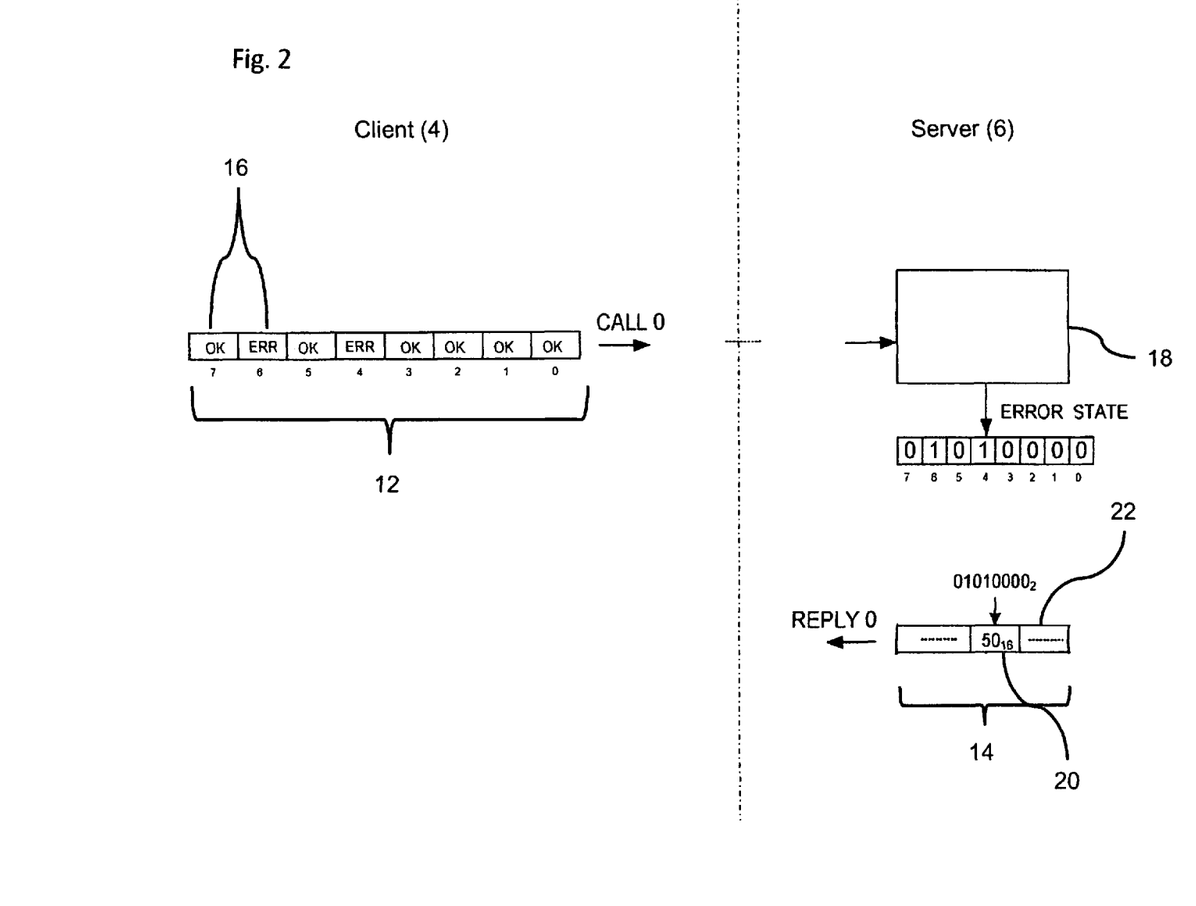
FIGS. 2 and 3 show a schematic flow chart of a client/server-communication while sending a call message.

As can be seen in FIG. 2, the client 4 sends a collected call message 12 comprising eight separate call messages 16 to the server 6, only some of them are a given a reference numeral for the sake of clarity. In the schematic flow chart shown in FIG. 2, the collected call message 12 is named "CALL 0". It is assumed that two of the eight call messages 16, namely call message number four and six, might be sent correctly but are corrupted when being received at the server 6, e.g. due to a transmission or network error. These call messages 12 are depicted as "ERR", the other ones are depicted as "OK". The server 6 detects the faulty messages, e.g. by CRC comparison, other redundancy checks or the like. As a result of this error detection 18, an error state (named as such in FIG. 2) indicating the successful or unsuccessful delivery of the call messages 16 is generated. According to FIG. 2 the error state consists of eight bits, whereas each bit corresponds to a respective call message 16 of the collected call message 12; a "0" indicates successful delivery of the call messages 16 while a "1" indicates unsuccessful delivery.

Subsequently, based on the data comprised by the successfully delivered call messages 16, the server 6 computes results and returns them in a collected reply message 14 to the client 4. This collected reply message 14 comprises said results as payload 22. Further, the collected reply message 14 comprises an error message 20 that is a hexadecimal code of the error state. The collected reply message 14 is named "REPLY 0" in FIG. 2.

The client 4 is capable of decoding the error message 20, so the client 4 becomes aware of the information that call messages 16 number four and six have been transmitted erroneous. Accordingly, the client 4 retransmits said call messages 16 together with the next scheduled collected call message 12.

Figure 3:
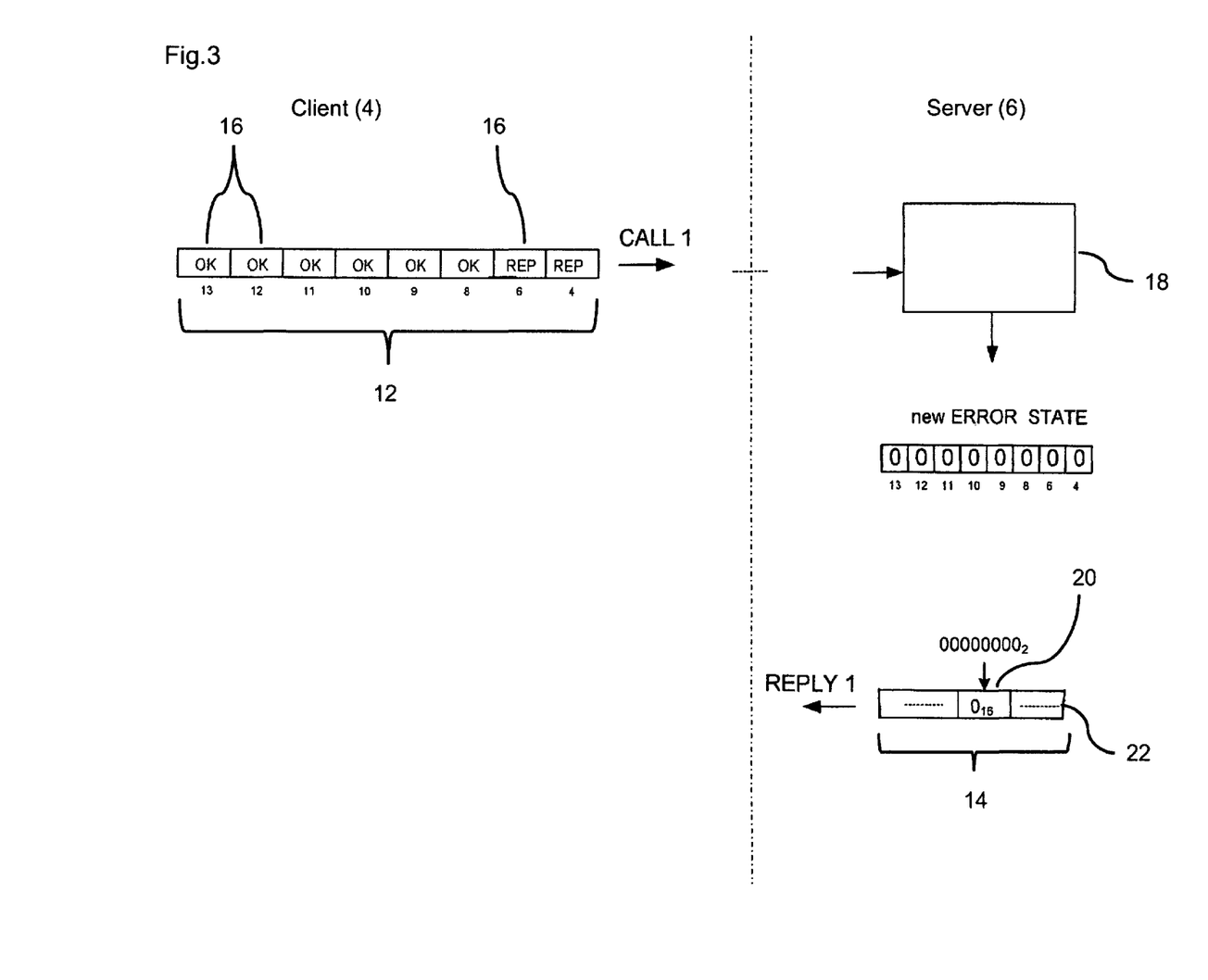

This next collected call message 12 is named "CALL 1" in FIG. 3. The two erroneous transmitted call messages 16 number four and six of "CALL 0", indicated as "REP" in FIG. 3, are concatenated to six new call messages 16 to form said collected call message 12 "CALL 1". Due to this measure a retransmission of the erroneous transmitted call messages 16 is affected.

According to the exemplary embodiment shown in FIG. 3, all of the blocks, i.e. all of the call messages 16 of the collected call message 12 "CALL 1" are successfully transmitted to the server 6, so its error detection 18 results in a new error state (named as such in FIG. 3) indicating that all call messages 16 of the collected call message 12 have been successfully transmitted. Accordingly, the collected reply message 14 named "REPLY 1" comprises an error message 20 indicating this successful delivery.

Figure 4:
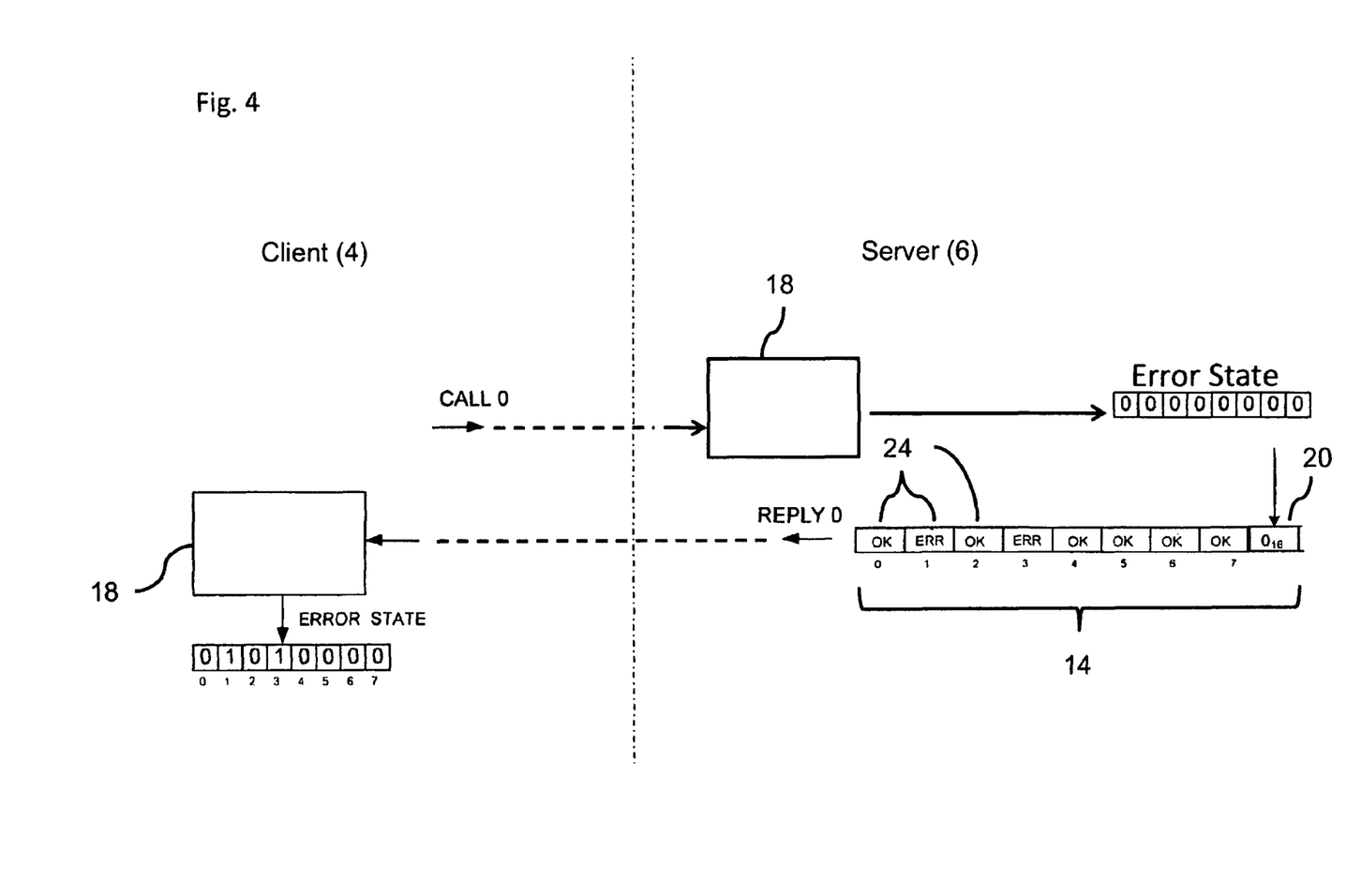
FIGS. 4 and 5 show a schematic flow chart of a server/client-communication while sending a reply message.

In the following, the server/client communication while sending a collected reply message 14 will be explained by making reference to FIGS. 4 and 5.

At first, it is assumed that a collected call message 12, named "CALL 0" is successfully transmitted from the client 4 to the server 6. Accordingly, the error detection 18 at the server side results in an error state indicating successful delivery. In a collected reply message 14, an error message 20 indicating that successful delivery is comprised among a plurality of reply messages 24 containing payload data, namely the results of the parameters received by the collected call messages 12. Only some of the reply messages 24 are given a reference numeral for the sake of better clarity.

Exemplarily, the reply messages 24 number one and three, which might be sent correctly, are corrupted when received at the client 4, e.g. by a network error. These reply messages 24 are depicted as "ERR", the other ones are depicted as "OK". As a result, the error detection 18 on the client side results in an error state indicating the faulty delivery of reply message number one and three, indicated by a "1". The client's error detection 18 may be performed by CRC-Comparison or the like.

Figure 5:
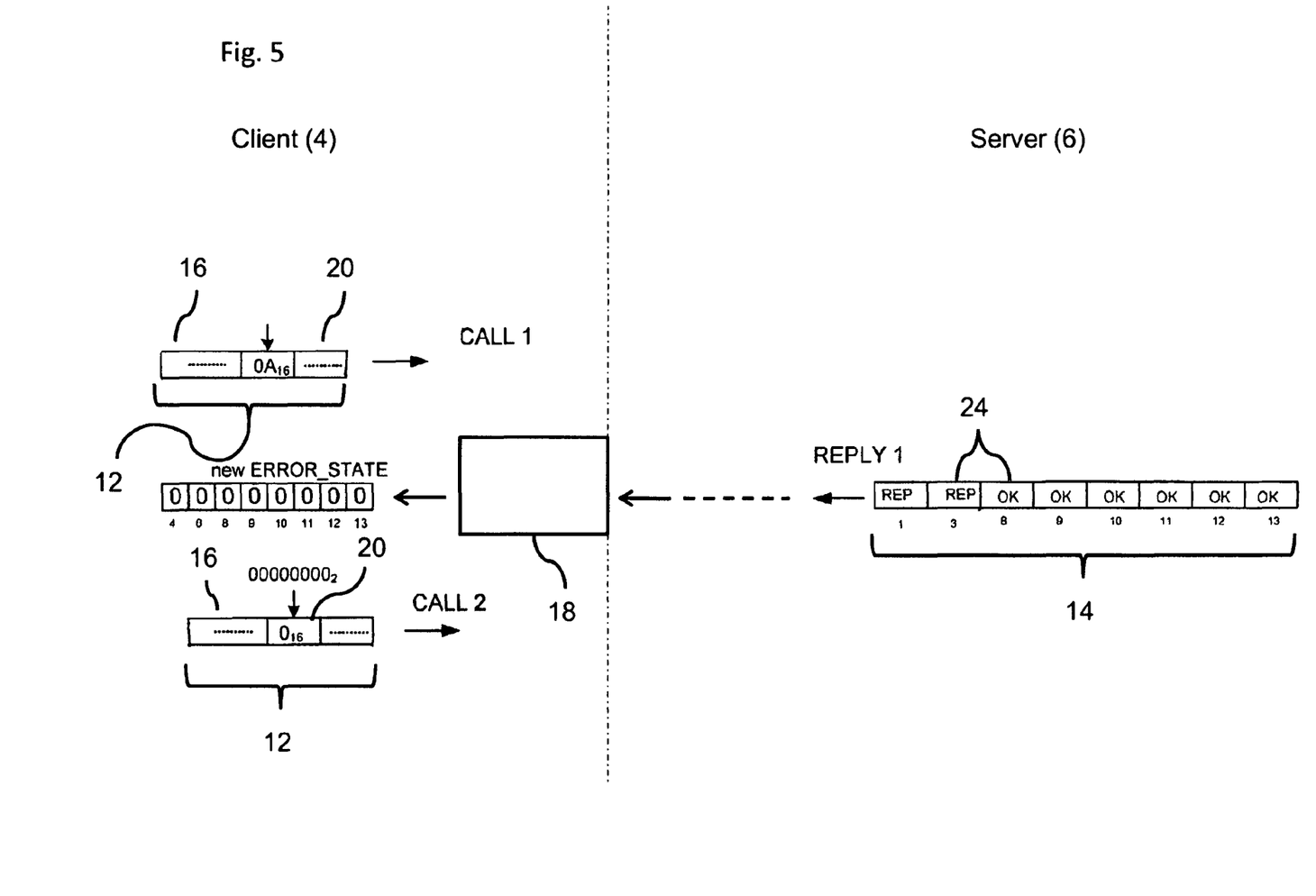

The corresponding binary error message 20 is included into the next collected call message 12 among further call messages 16, as it is depicted in FIG. 5. Said collected call message 12, named "CALL 1", is delivered from the client 4 to the server 6. The server 6 is capable of reading the error message 20 and consequently it retransmits the faulty delivered reply messages 24 number one and three, indicated as "REP" in FIG. 5, in the next collected reply message 14 named "REPLY 1". The error detection 18 at the client side results in a new error state (named as such in FIG. 5) indicating the successful delivery of all reply messages 24. In a subsequent collected call message 12, namely "CALL 2" an error message 20 is integrated indicating that delivery was completely successful.

What is claimed is:

1. A method of handling collected call message error conditions in a remote procedure call handler in a client, the client being connected to a server via a network, the method comprising:
   collecting and grouping at least two remote procedure calls into a first collected call message, and sending the first collected call message to the server,
   receiving, from the server, one or more error messages indicating an erroneous transmission of one or more of the remote procedure calls of the first collected call message, and
   combining at least one further remote procedure call that is independent from the remote procedure calls of the first collected call message and all of the one or more remote procedure calls for which an error message was received, or combining all of at least two remote procedure calls for which error messages were received, into a second collected call message, and transmitting said second collected call message to the server.

2. The method of claim 1, wherein the receiving comprises:
   receiving a first collected reply message comprising at least one response associated with corresponding remote procedure calls of said first collected call message and one or more error messages, or comprising at least two error messages.

3. The method of claim 2, wherein the first collected reply message comprises responses to all successfully transmitted remote procedure calls of said first collected call message.

4. A method of handling collected call message error conditions in a remote procedure call handler in a server, the server being connected to a client via a network, the method comprising:
   receiving, from the client, a first collected call message comprising at least two remote procedure calls,
   detecting one or more erroneous remote procedure calls in the received first collected call message,
   generating one or more error messages in response to the detected one or more erroneous remote procedure calls,
   combining at least one of the one or more error messages and at least one response to a remote procedure call, or combining at least two error messages, into a first collected reply message, and
   sending said first collected reply message to the client.

5. The method of claim 4, wherein the sending said first collected reply message comprises:
   sending a collected reply message comprising at least one response associated with a remote procedure call of a first collected call message received from the client.

6. The method of claim 5, wherein said collected reply message comprises responses to all successfully received remote procedure calls of said first collected call message received from the client.

7. A computer system comprising:
a server;
a client; and
a network connecting the server and the client,
wherein the client comprises a remote procedure call handler for executing
collecting and grouping at least two remote procedure calls into a first collected call message, and sending the first collected call message to the server,
receiving, from the server, one or more error messages indicating an erroneous transmission of one or more of the remote procedure calls of the first collected call message, and
combining at least one further remote procedure call that is independent from the remote procedure calls of the first collected call message and all of the one or more remote procedure calls for which an error message was received, or combining all of at least two remote procedure calls for which error messages were received, into a second collected call message, and transmitting said second collected call message to the server.

8. The computer system of claim 7, further comprising receiving a first collected reply message comprising at least one response associated with corresponding remote procedure calls of said first collected call message and one or more error messages, or comprising at least two error messages.

9. The computer system claim 8, wherein the first collected reply message comprises responses to all successfully transmitted remote procedure calls of said first collected call message.

10. A computer system comprising:
a server;
a client; and
a network connecting the server and the client,
wherein the server comprises a remote procedure call handler configured to execute
receiving, from the client, a first collected call message comprising at least two remote procedure calls,
detecting one or more erroneous remote procedure calls in the received first collected call message,
generating one or more error messages in response to the detected one or more erroneous remote procedure calls,
combining at least one of the one or more error messages and at least one response to a remote procedure call, or combining at least two error messages, into a first collected reply message, and
sending said first collected reply message to the client.

11. A client comprising:
a memory; and
a processor configured to:
collect and group at least two remote procedure calls into a first collected call message, and send the first collected call message to a server,
receive, from the server, one or more error messages indicating an erroneous transmission of one or more of the remote procedure calls of the first collected call message, and
combine at least one further remote procedure call that is independent from the remote procedure calls of the first collected call message and all of the one or more remote procedure calls for which an error message was received, or combine all of at least two remote procedure calls for which error messages were received, into a second collected call message, and transmit said second collected call message to the server.

12. The client of claim 11, wherein to receive one or more error messages from the server, the processor is configured to:
receive a first collected reply message comprising at least one response associated with corresponding remote procedure calls of said first collected call message and one or more error messages, or comprising at least two error messages.

13. The client of claim 12, wherein the first collected reply message comprises responses to all successfully transmitted remote procedure calls of said first collected call message.

14. A server comprising:
a memory; and
a processor configured to:
receive, from a client, a first collected call message comprising at least two remote procedure calls,
detect one or more erroneous remote procedure calls in the received first collected call message,
generate one or more error messages in response to the detected one or more erroneous remote procedure calls,
combine at least one of the one or more error messages and at least one response to a remote procedure call, or combine at least two error messages, into a first collected reply message, and
send said first collected reply message to the client.

15. The server of claim 14, wherein to send said first collected reply message, the processor is configured to:
send a collected reply message comprising at least one response associated with a remote procedure call of a first collected call message received from the client.

16. The server of claim 15, wherein said collected reply message comprises responses to all successfully received remote procedure calls of said first collected call message received from the client.

17. A method of handling collected call message error conditions in a remote procedure call handler in a client, the client being connected to a server via a network, the method comprising:
collecting and grouping at least two remote procedure calls into a first collected call message, and sending the first collected call message to the server;
receiving, from the server, one or more error messages indicating an erroneous transmission of one or more of the remote procedure calls of the first collected call message; and
combining at least one further remote procedure call that is independent from the remote procedure calls of the first collected call message and all of the one or more remote procedure calls for which an error message was received.

18. The method of claim 17, wherein the receiving comprises:
receiving a first collected reply message comprising at least one response associated with corresponding remote procedure calls of said first collected call message and one or more error messages, or comprising at least two error messages.

19. The method of claim 18, wherein the first collected reply message comprises responses to all successfully transmitted remote procedure calls of said first collected call message.

20. A method of handling collected call message error conditions in a remote procedure call handler in a client, the client being connected to a server via a network, the method comprising:
- collecting and grouping at least two remote procedure calls into a first collected call message, and sending the first collected call message to the server;
- receiving, from the server, one or more error messages indicating an erroneous transmission of one or more of the remote procedure calls of the first collected call message; and
- combining all of at least two remote procedure calls for which error messages were received, into a second collected call message, and transmitting said second collected call message to the server.

21. The method of claim 20, wherein the receiving comprises:
- receiving a first collected reply message comprising at least one response associated with corresponding remote procedure calls of said first collected call message and one or more error messages, or comprising at least two error messages.

22. The method of claim 21, wherein the first collected reply message comprises responses to all successfully transmitted remote procedure calls of said first collected call message.

* * * * *